(12) United States Patent
Demetri

(10) Patent No.: US 6,401,445 B1
(45) Date of Patent: Jun. 11, 2002

(54) ELECTROLYSIS SYSTEM AND METHOD FOR IMPROVING FUEL ATOMIZATION AND COMBUSTION

(75) Inventor: Elia P. Demetri, Woburn, MA (US)

(73) Assignee: Northern Research & Engineering Corp., Woburn, MA (US)

( * ) Notice: Subject to any disclaimer, the term of this patent is extended or adjusted under 35 U.S.C. 154(b) by 0 days.

(21) Appl. No.: 09/456,241

(22) Filed: Dec. 7, 1999

(51) Int. Cl.[7] ................................................. F02G 7/26
(52) U.S. Cl. ........................ 60/39.06; 60/740; 60/743; 60/39.12
(58) Field of Search ...................... 60/39.05, 39.55, 60/39.463, 39.464, 39.12, 39.465, 39.461, 39.02, 740, 743

(56) References Cited

U.S. PATENT DOCUMENTS

| | | |
|---|---|---|
| 3,180,813 A | 4/1965 | Wasp et al. |
| 3,269,446 A | 8/1966 | Luther |
| 3,394,062 A | 7/1968 | Rhodes |
| 3,416,870 A | 12/1968 | Wright |
| 3,474,023 A | 10/1969 | Bloch |
| 3,505,018 A | 4/1970 | Bawa et al. |
| 4,081,656 A | 3/1978 | Brown |
| 4,309,192 A | 1/1982 | Kubo et al. |
| 4,355,969 A | 10/1982 | Nelson et al. |
| 4,424,065 A | 1/1984 | Langhoff et al. |
| 4,437,954 A | 3/1984 | Sammells et al. |
| 4,453,594 A | 6/1984 | Patton et al. |
| 4,496,441 A | 1/1985 | Sweeney et al. |
| 4,591,362 A | 5/1986 | Yudovich et al. |
| 4,643,809 A | 2/1987 | Botts et al. |
| 4,762,532 A | 8/1988 | Lipp |
| 4,786,291 A | 11/1988 | Wilson |
| 4,881,476 A | 11/1989 | Becker et al. |
| 4,899,670 A | 2/1990 | Hansel |
| 5,147,045 A | 9/1992 | Chi et al. |
| 5,152,463 A * | 10/1992 | Mao et al. .................. 239/402 |
| 5,185,997 A * | 2/1993 | Nishijima .................. 60/39.07 |
| 5,271,813 A | 12/1993 | Linkous |
| 5,380,342 A | 1/1995 | Leonard, III et al. |
| 5,399,251 A | 3/1995 | Nakamats |
| 5,480,518 A | 1/1996 | Shane et al. |
| 5,484,512 A | 1/1996 | Sasaki et al. |
| 5,647,877 A | 7/1997 | Epstein |
| 5,679,236 A * | 10/1997 | Poschl ....................... 205/351 |
| 5,702,244 A | 12/1997 | Goodson et al. |
| 5,772,708 A | 6/1998 | Froehlich |
| 5,796,799 A | 8/1998 | Kobayashi et al. |

* cited by examiner

Primary Examiner—Timothy S. Thorpe
Assistant Examiner—William H Rodriguez
(74) Attorney, Agent, or Firm—Michael Best & Friedrich LLP

(57) ABSTRACT

An atomization system that includes a flow conduit for flowing a fuel/non-fuel mixture to a downstream object of interest. The flow conduit defining a flow chamber, a downstream end, and an upstream end. An electrolysis system is located in the chamber proximate the upstream conduit end and an atomizer is located in the chamber proximate the downstream conduit end. The fuel/non-fuel mixture being in the liquid phase as it flows through the electrolysis system.

11 Claims, 4 Drawing Sheets

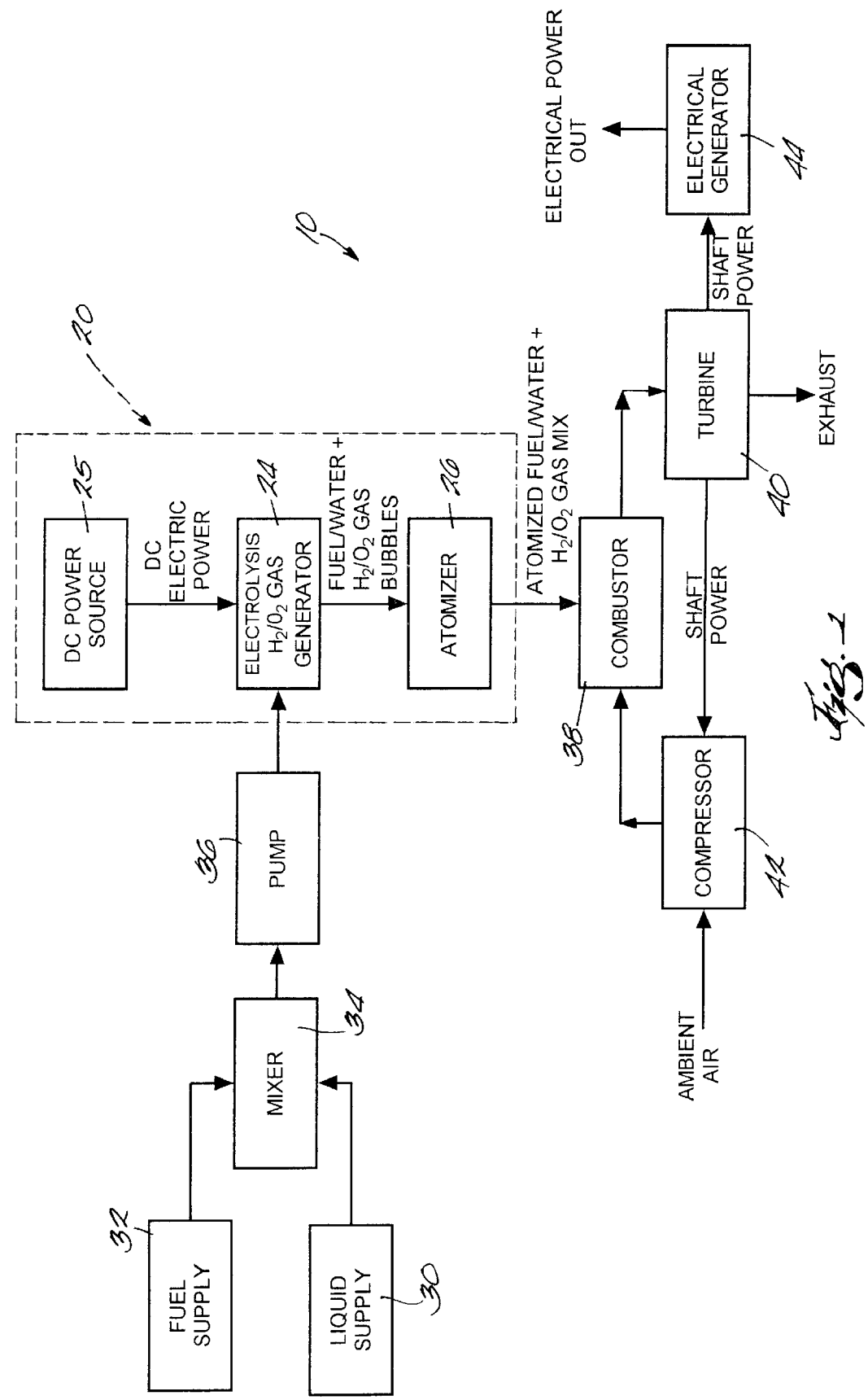

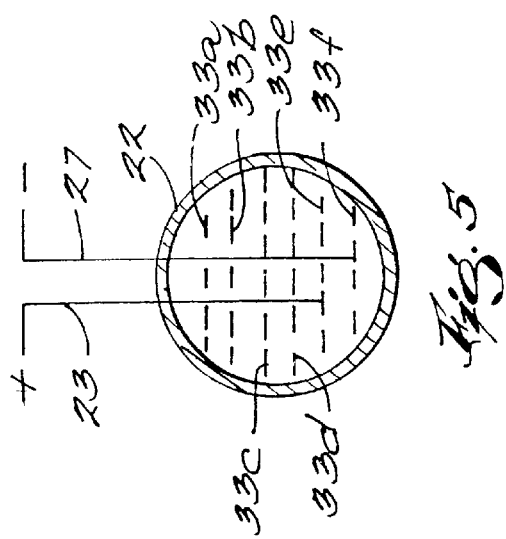
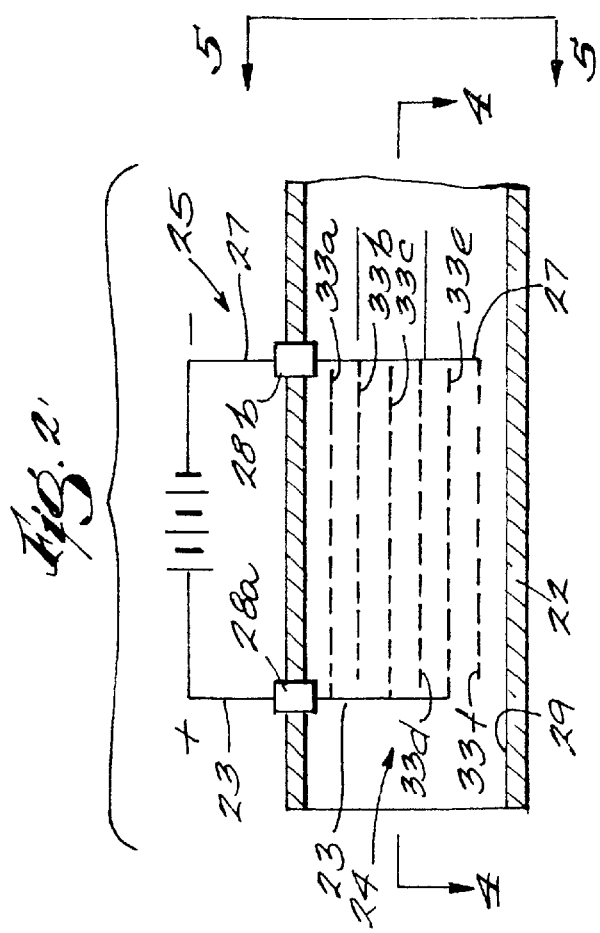
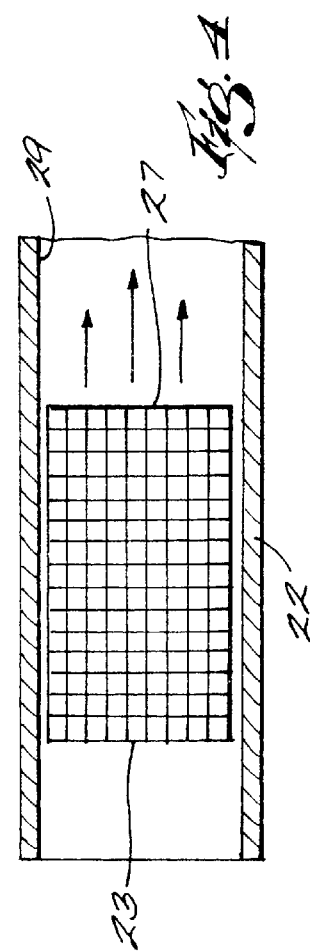

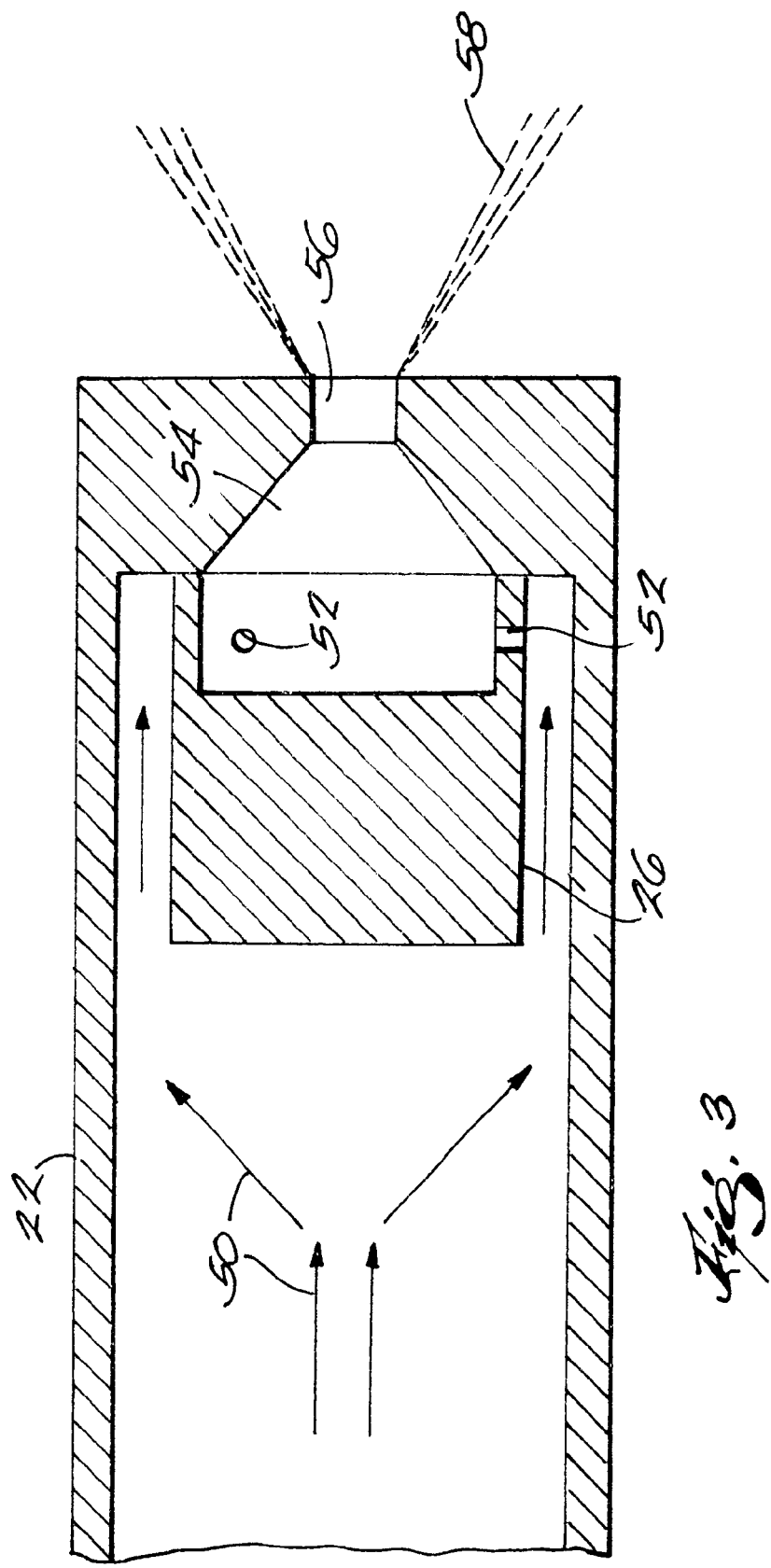

ELECTROLYSIS SYSTEM AND METHOD FOR IMPROVING FUEL ATOMIZATION AND COMBUSTION

BACKGROUND OF THE INVENTION

The invention relates to a fuel atomization system and method and more particularly the invention relates to a fuel atomization system and method that utilizes an electrolysis system to produce the desired atomization and improvement of the combustion process.

The ability to utilize coal and other low-grade fuels effectively is becoming increasingly important as the worldwide supply of more conventional fuels is depleted. The technology of coal-water fuels has been under development since the early 1980's and such development work continues to receive active support from the energy community.

One approach that offers promise for increasing coal utilization consists of mixing pulverized coal with water to produce a slurry. This provides the coal in a liquid form that can be more easily injected and used in boilers or, potentially in power producing equipment such as diesel engines and gas turbines. Commercial acceptance of this approach however has been limited for several reasons. One reason for the limited acceptance is the difficulty of achieving acceptable atomization of the viscous slurry. Another reason for the limited acceptance is the difficulty of igniting the fuel and sustaining stable combustion. This is due to the inherent quenching effect of the water and the low reactivity of the coal. The invention disclosed herein provides the capability of effectively dealing with both of these reasons for limited acceptance.

The simplest conventional method of atomization is comprised of pressurizing the liquid fuel and injecting it at high velocity into the combustion air. The resulting shear created at the free surface between the liquid fuel and the surrounding air provides the force required for disintegration of the liquid fuel into small droplets. This approach has not been practical for coal-water fuels. The high injection velocities required to atomize the viscous fuel and the abrasive nature of the ash contained in the coal combine to cause rapid wear of the injector orifice.

Twin-fluid atomizers offer a more satisfactory approach for coal-water fuels. In this type of design, a second coflowing gaseous fluid, such as air or steam, is introduced into the atomizer and is injected along with the liquid and a high relative velocity is created between the two streams due to their difference in density. This provides the required atomization energy without causing excessive abrasion of the injector surfaces. In addition, the required operating pressure is considerably less with a two-fluid atomizer than with the simple hydraulic atomizer.

The effervescent atomizer is a particularly effective variation of the basic twin-fluid configuration. In this approach, the second fluid is introduced into the atomizer so that it is distributed in the form of small bubbles throughout the liquid stream. When this bubbly stream exits the atomizer it is distributed in the form of small bubbles throughout the liquid stream. When the bubbly stream exits the atomizer, the intimately mixed gas component rapidly expands causing efficient atomization of the liquid.

Although the twin-fluid and effervescent atomizers have solved a number of the problems associated with the atomization of low grade fuels, known methods of atomization do not provide the means to promote the stable, efficient combustion of these fuels required for their widespread commercial acceptance.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an atomization system that includes a flow conduit for flowing a fuel/water mixture to a downstream object of interest. The flow conduit defines a flow chamber with an electrolysis system located in the chamber at an upstream conduit end and an atomizer located at a downstream conduit end. The fuel/water mixture is in the liquid phase as it flows through the electrolysis system where gas bubbles are generated and in this way, effective atomization occurs as the mixture is flowed downstream through the atomizer.

The foregoing and other aspects will become apparent from the following detailed description of the invention when considered in conjunction with the accompanying drawing figures.

DESCRIPTION OF THE DRAWING FIGURES

FIG. 1 is a schematic representation of a system that generally includes the atomization system of the present invention.

FIG. 2 is a longitudinal sectional view of a portion of the atomization system flow conduit that includes an electrolysis system.

FIG. 3 is a longitudinal sectional view of a portion of the atomization system that includes an atomizer.

FIG. 4 is a longitudinal sectional view taken along line 4—4 of FIG. 2.

FIG. 5 is a lateral sectional view taken along line 5—5 of FIG. 2.

DESCRIPTION OF THE PREFERRED EMBODIMENT

Figure 6:
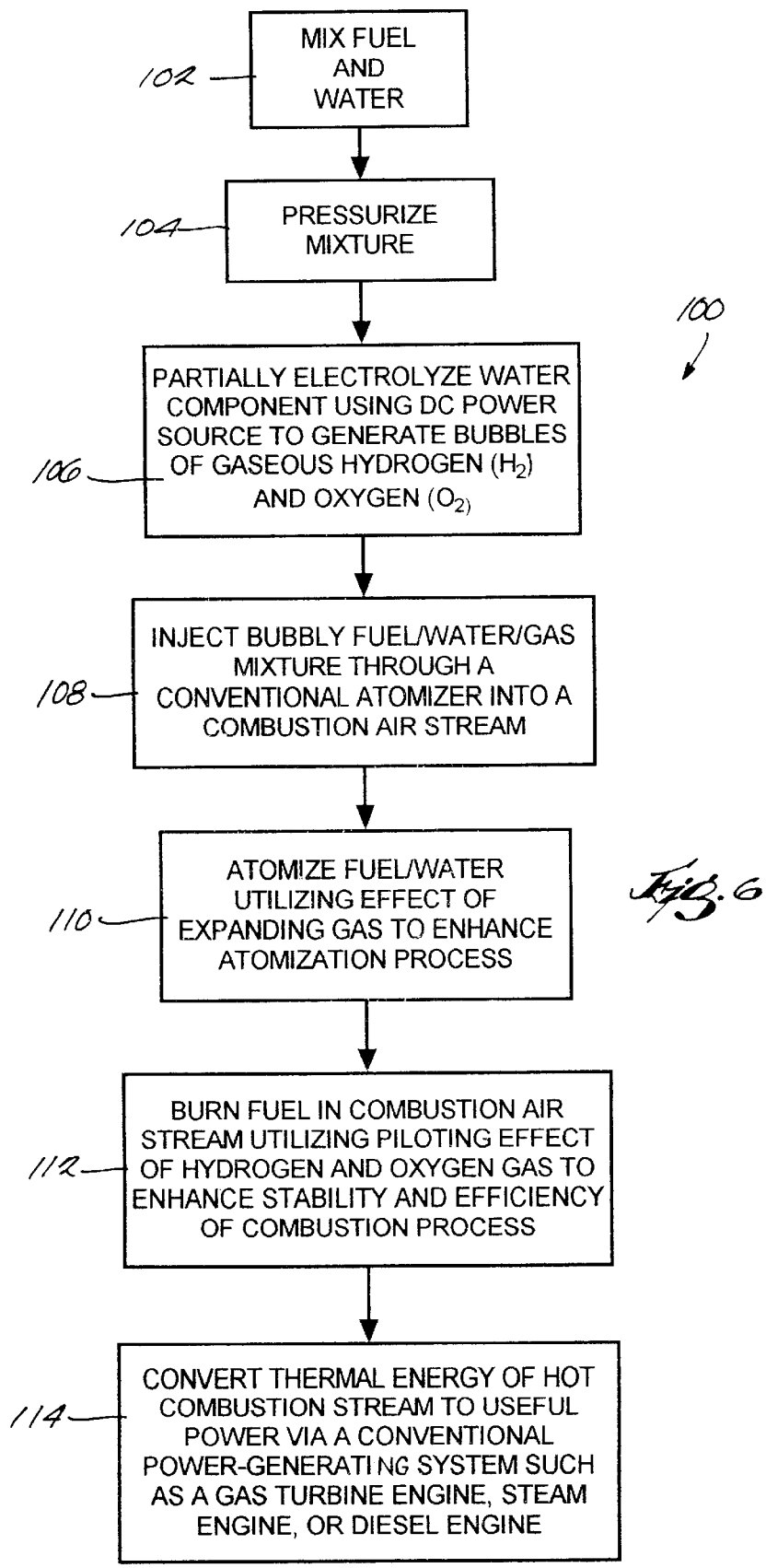
FIG. 6 is a flow chart representation of the operation of the system of FIG. 1.

Turning now to the drawings wherein like parts are referred to by the same number throughout the several views, FIG. 1 is a schematic representation of combustion system 10 that includes the atomization system 20 of the present invention.

Generally in system 10, a volume of a liquid that is not a fuel is supplied from conventional storage tank 30 and a volume of fuel is supplied from a conventional fuel storage vessel 32 to a conventional mixing device 34. The liquid may be any suitable liquid such as but not limited to, a pure hydrocarbon or water. However, for purposes of describing the preferred embodiment of the invention, the liquid mixed with the fuel is water. Storage tank 30 includes the requisite valves and other conventional flow regulating devices and mechanisms that are adapted to ensure the correct volume of liquid is supplied from the storage tank 30 to mixing device 34. Such valves and flow control devices are well known to one skilled in the art and therefore further description of these devices is not required. These flow control devices may be electrically connected to and actuated by a micro processor based controller (not shown).

The fuel that is mixed with the liquid in mixer 34 may be any suitable fuel such as but not limited to fuel oil or coal, and the storage device may be any vessel that is suitable for storing and dispensing the mixing fuel such as a fuel tank or hopper, for example. Like tank 30, fuel storage vessel 32 includes the requisite valves and/or flow and dispensing apparatus required to ensure the requisite volume of fuel is dispensed to the mixer 34 which may be electrically actuated by a conventional microprocessor based controller. These valves, flow and dispensing devices are well known in the art and therefore do not need to be discussed in further detail hereinafter. For purposes of the preferred embodiment the fuel will be coal.

Mixer 34 may be any mixing device suitable to mix a liquid and fuel such as a propellor or paddle agitator. The mixer is flow connected to the fuel tank and liquid tank by suitable piping.

Pump 36 is flow connected to mixer 34 and atomization system 20. The mixture of liquid and fuel is pumped by conventional pump 36 from the mixer 34 to the atomization system 20. The pump may be any suitable pump such as a centrifugal pump for example.

The atomized mixture of fuel and water is delivered from the atomization system 20 to a combustor 38 which burns the fuel and the heat energy produced by the combustor is delivered to turbine 40 and is used to drive a turbine 40 or another object of interest.

Operation of the system 10 will be described in further detail below.

Turning now to FIGS. 2–5 which show the atomization system of the present invention 20 in greater detail, FIGS. 2, 4, and 5 show the portion of the atomization conduit 22 that houses electrolysis system 24 and FIG. 3 shows the portion of the conduit 22 that houses the atomizer 26. The conduit is an elongate continuous member and in order to show the atomizer and electrolysis system, the conduit is shown in two segments. However, for clarity, it should be understood that FIGS. 2 and 3 or FIGS. 2 and 4 taken together represent the length of conduit 22.

The electrolysis system 24 has a DC power source 25 that is electrically connected to conductive members 33a through 33f by positively and negatively charged electrodes 23 and 27 respectively. The power source 25 is located outside the conduit 22 and the electrodes 23 and 27 pass through respective conduit insulating sleeves 28a and 28b and the electrodes are electrically connected to opposite lateral edges of conductive members 33a through 33f. See FIG. 2. For purposes of the preferred embodiment of the invention the conductive member is a mesh box comprised of multiple pairs of wire screen electrodes distributed over the cross section of the flow passage 29. See FIGS. 4 and 5. The electrodes 23 and 27 may be plates or wires that are soldered or otherwise electrically connected to the upstream and downstream lateral edges of longitudinally extending members 33a–f as generally illustrated in FIG. 2 and in this way, the desired closed electrical circuit through the surrounding fluid is produced. The electrodes are electrically connected to alternating longitudinal members. For example, electrode 23 is connected to members 33a, 33c, and 33e; and electrode 27 is connected to members 33b, 33d, and 33e. Although six longitudinal members 33a–f are shown and described, it should be understood that any suitable configuration of longitudinal members may be used. The mesh conductive members 33a through 33f may be made from any suitable conductive material such as copper. The mesh provides multiple electrode sites for generation of oxygen and hydrogen bubbles which flow downstream to the atomizer.

The electrolysis system 24 is used to generate hydrogen and oxygen which promotes combustion of the fuel. The electrolysis system is placed in the conduit chamber upstream of the atomizer and is effected when the liquid and fuel mixture is in the liquid phase and before atomization.

Downstream of the electrolysis system 24 is conventional atomizer 26 which may be a simplex hydraulic type atomizer. The fuel and liquid mixture flows to the atomizer in the direction of arrows 50, through peripheral inlet openings 52 spaced around the atomizer housing, through the swirl chamber 54, out the discharge orifice 56 and into combustor 38 where the fuel is burned. The atomized spray 58 is discharged in a conical configuration 58 as shown in FIG. 3.

Operation of the system 10 will now be described.

Referring to FIG. 6, in Step 102, fuel and water is supplied to and is mixed by conventional mixer 34 and then in Step 104 the fuel/water mixture is pressurized by pump 36 and is directed into the atomization system chamber 29 as a fuel/water liquid mixture, and upstream of atomizer 26.

As the liquid mixture passes through the chamber 29, it flows through electrolysis system 24 and more specifically, conductive member 21. See Step 106. The water component of the fuel/liquid mixture is partially electrolyzed by the electrolysis system 24. The DC power source 25 is used to generate bubbles of gaseous hydrogen ($H_2$) and oxygen ($O_2$). The voltage of the power source 25 is controlled to provide an electric current which passes through the fuel/water mixture from the positive anode 23 to the negative cathode 27. The current electrolyzes a portion of the water component of the fuel generating gaseous oxygen at the anode and gaseous hydrogen at the cathode in accordance with the following reactions where $e^-$ refers to an electron:

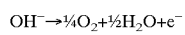

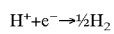

The electrode geometry is designed to promote the formation of these gases in the form of small bubbles distributed uniformly throughout the flow stream. During operation, the oxygen gas bubbles gather along negatively charged members 33b, 33d, and 33e; and the hydrogen gas bubbles gather along the positively charged members 33a, 33c, and 33e.

In Step 108 the bubbly flow stream leaving the electrolysis system enters the atomizer. The atomizer serves to produce atomization of the mixture. The atomizer, which can be designed in accordance with conventional practice, provides swirling motion to the flow so that the mixture exits in the form of a conical spray 58. The spray 58 consists of a cloud of small fuel droplets interspersed with a stoichiometric mixture of gaseous hydrogen and oxygen. The dispersed bubbles of gaseous hydrogen and oxygen in the spray expand rapidly causing effective atomization of the liquid into small droplets.

The atomization is provided in Step 110 and the atomized fuel/water mixture is injected into the conventional combustor 38 in Step 112 where the fuel is burned. Combustion may also occur in a diesel engine, boiler, furnace or any other device when fuel is burned in air.

The presence of highly reactive hydrogen, considerably reduces the difficulty of achieving reliable ignition of the fuel spray in the combustor. Once the ignition occurs, the small amount of hydrogen flow promotes stable sustained combustion of the fuel by acting as a continuous high temperature pilot for the combustion. This effect is further enhanced by the additional presence of pure oxygen. Additionally, conventional compressor 42 supplies high pressure ambient air into the combustor to provide the main source of air for the combustion process.

The heat energy produced by the combustor is used to drive compressor 42 and another object of interest such as an electrical generator 44 for example. See Step 114.

The ideal theoretical energy required for the electrolysis is equal to the heat of combustion of hydrogen. The actual value will be larger because of inefficiencies and the pressure-volume work associated with the evolution of the gas. All of this energy is not lost however, since the hydrogen generated does burn in the combustion chamber and contributes to the heat produced. The required electrical energy, which should be within practical limits, will depend on the amount of gas generation needed to serve the dual purposes of atomization and combustion enhancement.

The invention disclosed hereinabove, addresses a number of the major problems which hinder the effective utilization of low-grade fuels. The system requires only the moving parts described herein and is simpler and more reliable than conventional systems. Additionally, combustion in the present invention is achieved with greater efficiency and stability than with conventional systems.

While I have illustrated and described a preferred embodiment of my invention, it is understood that this is capable of modification. I therefore do not wish to be limited to the precise details set forth, but desire to avail myself of such changes and alterations as fall within the purview of the following claims.

Having described the invention, what is claimed is:

1. A system for atomization and combustion, the system comprising:
    A. a mixer for mixing a volume of fuel with a volume of a fluid that is not a fuel;
    B. an atomization system flow connected to the mixer downstream from the mixer, the atomization system comprising:
        1. a flow conduit that defines a chamber;
        2. an electrolysis system located in the chamber;
        3. an atomizer downstream from the electrolysis system, the atomization system including a discharge opening for discharging the atomized volume of fuel and fluid from the chamber; and
    C. a combustor flow connected to the atomization chamber, the combustor being flow connected to the atomizer in atomized fluid receiving relation with the atomization system wherein the electrolysis system comprises a power source, a conductive member electrically connected to the power source, the conductive member being located in the chamber, wherein the conductive member is comprised of a mesh box having longitudinally extending members with lateral edges, the power source being electrically connected to the lateral member edges.

2. The system as claimed in claim 1 wherein the system further comprises a pump flow connected to the mixer and the atomization system, to pressurize the mixture and force the mixture downstream to the atomization system.

3. The system as claimed in claim 1 wherein the system further comprises a turbine flow connected to the combustor.

4. The system as claimed in claim 3 further comprising a generator operatively connected to the turbine to be driven by the turbine.

5. The system as claimed in claim 3, further comprising a compressor operatively connected to the turbine to be driven by the turbine, the compressor for flowing high pressure air into the combustor to promote the combustion process.

6. The system as claimed in claim 1 wherein combustor is a diesel engine, a boiler, a furnace or any other device where fuel is burned in air.

7. The system as claimed in claim 1 wherein the power source has a first electrode and a second electrode, the first and second electrodes being electrically connected to alternating lateral edges of the longitudinal members.

8. The system as claimed in claim 1 wherein the power source is a DC power source.

9. An atomization system comprising: a flow conduit for flowing a fuel/water mixture to a downstream object of interest, the flow conduit defining a chamber, a downstream end and an upstream end; the system further comprising an electrolysis system located in the chamber proximate the downstream conduit end; and an atomizer located proximate the upstream conduit end; the mixture being in the liquid phase as it flows through the electrolysis system,
    wherein the electrolysis system comprises a power source, a conductive member electrically connected to the power source, the conductive member being located in the chamber wherein the conductive member is comprised of a mesh box having longitudinally extending members with lateral edges, the power source being electrically connected to the lateral member edges.

10. The system as claimed in claim 9 wherein the power source has a first electrode and a second electrode, the first and second electrodes being electrically connected to alternating lateral edges of the longitudinal members.

11. The system as claimed in claim 9 wherein the power source is a DC power source.

* * * * *